United States Patent
Jacobsen et al.

(10) Patent No.: US 7,903,538 B2
(45) Date of Patent: *Mar. 8, 2011

(54) TECHNIQUE TO SELECT TRANSMISSION PARAMETERS

(75) Inventors: Eric A. Jacobsen, Scottsdale, AZ (US); Bo Xia, Tucson, AZ (US)

(73) Assignee: Intel Corporation, Santa Clara, CA (US)

(*) Notice: Subject to any disclaimer, the term of this patent is extended or adjusted under 35 U.S.C. 154(b) by 1137 days.

This patent is subject to a terminal disclaimer.

(21) Appl. No.: 10/636,765

(22) Filed: Aug. 6, 2003

(65) Prior Publication Data

US 2005/0030887 A1  Feb. 10, 2005

(51) Int. Cl.
*H04J 11/00* (2006.01)
*H04J 3/16* (2006.01)
*H04J 3/22* (2006.01)
*H04J 1/00* (2006.01)
*H04K 1/10* (2006.01)
*H04L 27/28* (2006.01)

(52) U.S. Cl. .......... 370/208; 370/465; 370/480; 375/260

(58) Field of Classification Search .................. 370/203, 370/208, 210, 465, 468
See application file for complete search history.

(56) References Cited

U.S. PATENT DOCUMENTS

| 6,456,670 B1 | 9/2002 | Kindler et al. | |
| 6,628,723 B1* | 9/2003 | Gerlach et al. | 375/259 |
| 6,847,678 B2* | 1/2005 | Berezdivin et al. | 375/146 |
| 7,164,649 B2* | 1/2007 | Walton et al. | 370/203 |
| 7,213,197 B2* | 5/2007 | Jacobsen et al. | 714/800 |
| 7,386,072 B2* | 6/2008 | Uno | 375/344 |
| 2002/0006171 A1* | 1/2002 | Nielsen | 375/316 |
| 2002/0105950 A1* | 8/2002 | Dapper et al. | 370/386 |
| 2002/0191630 A1* | 12/2002 | Jacobsen | 370/430 |
| 2003/0086371 A1* | 5/2003 | Walton et al. | 370/235 |
| 2003/0095508 A1* | 5/2003 | Kadous et al. | 370/252 |
| 2003/0097623 A1* | 5/2003 | Razavilar et al. | 714/704 |
| 2003/0112880 A1* | 6/2003 | Walton et al. | 375/260 |
| 2003/0123383 A1* | 7/2003 | Korobkov et al. | 370/208 |
| 2003/0203721 A1 | 10/2003 | Berezdivin et al. | |
| 2004/0160892 A1* | 8/2004 | Agrawalla et al. | 370/203 |

FOREIGN PATENT DOCUMENTS

| EP | 1 241 824 A1 | 9/2002 |
| WO | WO 02/058305 A2 | 7/2002 |
| WO | 02095979 | 11/2002 |
| WO | WO 02/095978 A1 | 11/2002 |
| WO | 03092212 | 11/2003 |

OTHER PUBLICATIONS

"T1.413 Issue 2," Standards Project for Interfaces Relating to Carrier to Customer Connection of Asymmetrical Digital Subscriber Line (ADSL) Equipment, TIE1.4/97-007R6, Sep. 26, 1997, pp. i-218.
Rainer Grünheid et al., "Adaptive Modulation for the HIPERLAN/2 Air Interface," 5th International OFDM-Workshop, 2000, pp. 4-1-4-4, Hamburg, Germany.
"Part III: Forward Error Control Codes," pp. 1-56.

* cited by examiner

*Primary Examiner* — William Trost, IV
*Assistant Examiner* — Andrew Chriss
(74) *Attorney, Agent, or Firm* — Kacvinsky Daisak PLLC

(57) ABSTRACT

Various embodiments are described to select or adjust transmission parameters in a multicarrier system wherein one or more transmission parameters are selected to substantially match a block of data to a group of multicarrier symbols.

49 Claims, 9 Drawing Sheets

TECHNIQUE TO SELECT TRANSMISSION PARAMETERS

BACKGROUND INFORMATION

Multicarrier communications may be described as a communications technique in which multiple carriers or subcarriers are used to communicate information. As an example of multicarrier communications, Orthogonal Frequency Division Multiplexing (OFDM) may be described as a communications technique that divides a communications channel into a number of spaced frequency bands. In OFDM, a subcarrier carrying a portion of the user information may be transmitted in each band. In OFDM, each subcarrier may be orthogonal, differentiating OFDM from the commonly used frequency division multiplexing (FDM). An OFDM symbol may include, for example, a symbol transmitted simultaneously on each of the OFDM subcarriers during the OFDM symbol period. These individual symbols may be referred to as subcarrier symbols.

Some OFDM communication systems may transport payloads or data blocks of varying lengths. In many cases, the end of the transmitted data block may not align with the end of an OFDM symbol, resulting in an unused portion of one or more OFDM symbols. Thus, for example, there may be one or more unmodulated (or unused) subcarriers in the final OFDM symbol for the data block. In many systems, this may be handled by zero-extending the data or repeating the data until the final OFDM symbol is filled. Unfortunately, simply data repeating or zero-extending to fill the OFDM symbol wastes valuable OFDM symbol resources. There may be a need for a technique to make more efficient use of an unused or unmodulated portion of OFDM symbols.

DETAILED DESCRIPTION

Figure 1:
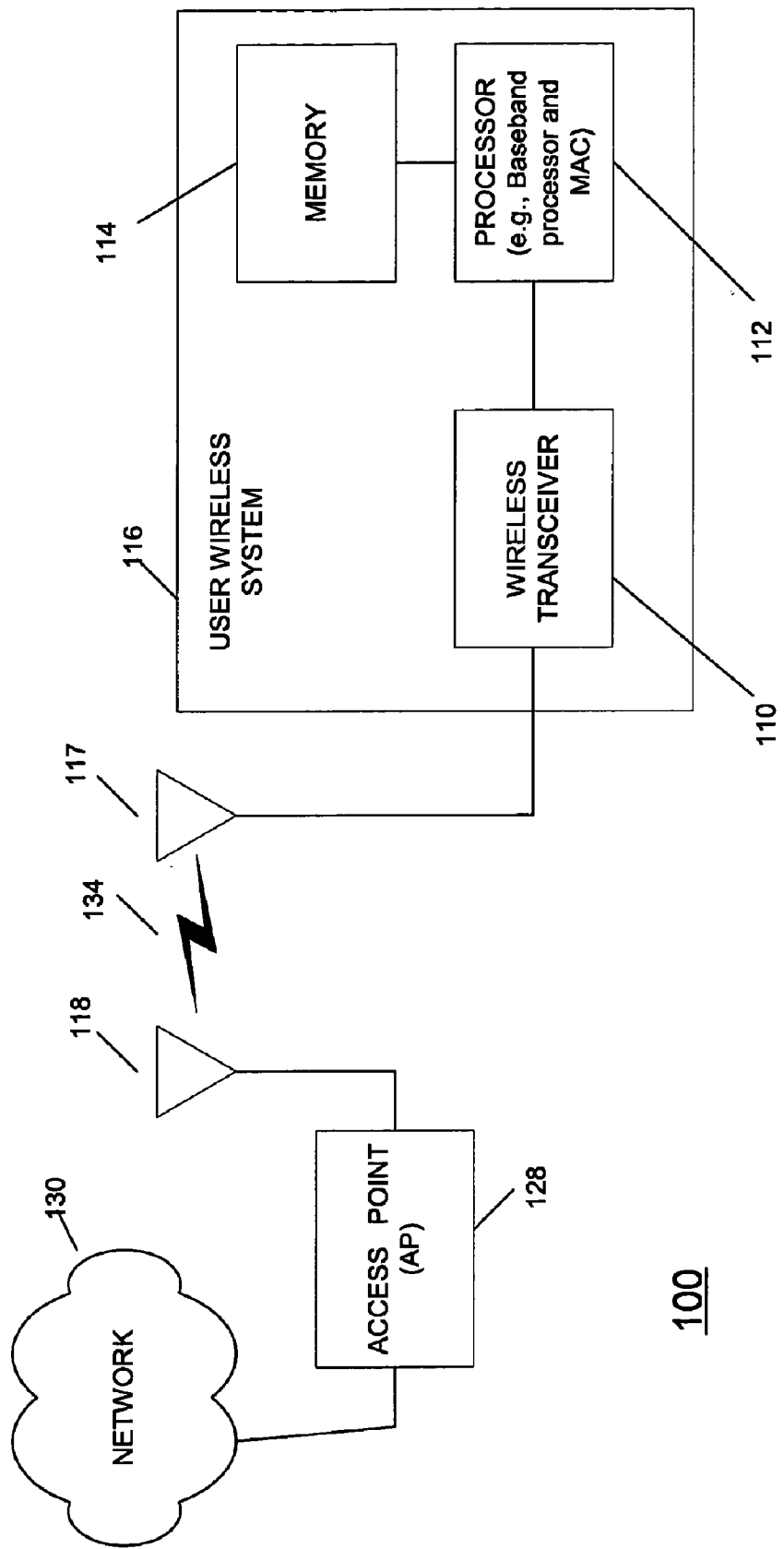
FIG. 1 is a diagram illustrating an example of a wireless communication system in accordance with one embodiment of the invention.

In the detailed description, numerous specific details are set forth in order to provide a thorough understanding of the embodiments of the invention. It will be understood by those skilled in the art, however, that embodiments of the invention may be practiced without these specific details. In other instances, well-known methods, procedures and techniques have not been described in detail so as not to obscure the foregoing embodiments.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" or "an embodiment" in various places in the specification do not necessarily refer to the same embodiment, but may be referring to different embodiments.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radio-telephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

As used herein, the term packet may include a unit of data that may be routed or transmitted between nodes or stations or across a network. As used herein, the term packet may include frames, protocol data units or other units of data. A packet may include a group of bits, which may include one or more address fields, control fields and data, for example. A data block may be any unit of data or information bits.

Referring to the Figures in which like numerals indicate like elements, FIG. 1 is a diagram illustrating an example of a wireless communication system in accordance with one embodiment of the invention. In the communications system 100 shown in FIG. 1, a user wireless system 116 may include a wireless transceiver 410 coupled to an antenna 117 and to a processor 112. Processor 112 in one embodiment may comprise a single processor, or alternatively may comprise a baseband processor and an applications processor, although the scope of the invention is not limited in this respect. According to one embodiment, processor 112 may include a baseband processor and Medium Access Control (MAC).

Processor 112 may couple to a memory 114 which may include volatile memory such as DRAM, non-volatile memory such as flash memory, or alternatively may include other types of storage such as a hard disk drive, although the scope of the invention is not limited in this respect. Some portion or all of memory 114 may be included on the same integrated circuit as processor 112, or alternatively some portion or all of memory 114 may be disposed on an integrated circuit or other medium, for example a hard disk drive, that is external to the integrated circuit of processor 112, although the scope of the invention is not limited in this respect. According to one embodiment, software may be provided in memory 114 to be executed by processor 112 to allow wireless system 116 to perform a variety of tasks, some of which may be described herein.

Wireless system 116 may communicate with an access point (AP) 128 (or other wireless system) via wireless communication link 134, where access point 128 may include at least one antenna 118. Antennas 117 and 118 may each be, for example, a directional antenna or an omni directional antenna, although the invention is not limited thereto. Although not shown in FIG. 1, AP 128 may, for example, include a structure that is similar to wireless system 116, including a wireless transceiver, a processor, a memory, and software provided in memory to allow AP 128 to perform a variety of functions. In an example embodiment, wireless system 116 and AP 128 may be considered to be stations in a wireless communication system, such as a WLAN system.

Access point 128 may be coupled to network 130 so that wireless system 116 may communicate with network 130, including devices coupled to network 130, by communicating with access point 128 via wireless communication link 134. Network 130 may include a public network such as a telephone network or the Internet, or alternatively network 130 may include a private network such as an intranet, or a combination of a public and a private network, although the scope of the invention is not limited in this respect.

Communication between wireless system 116 and access point 128 may be implemented via a wireless local area network (WLAN), for example a network which may be compliant with an Institute of Electrical and Electronics Engineers (IEEE) standard such as IEEE 802.11a, IEEE 802.11b, IEEE 802.11g and so on, although the scope of the invention is not limited in this respect.

In another embodiment, communication between wireless system 116 and access point 128 may be implemented via a cellular communication network compliant with a 3GPP standard, although the scope of the invention is not limited in this respect.

According to an example embodiment, a technique may be used to adapt or adjust one or more transmission parameters to reduce an unused portion of OFDM symbols for the transmission of a data block and/or to make more efficient use of the OFDM symbols during the transmission of a data block.

Figure 2:
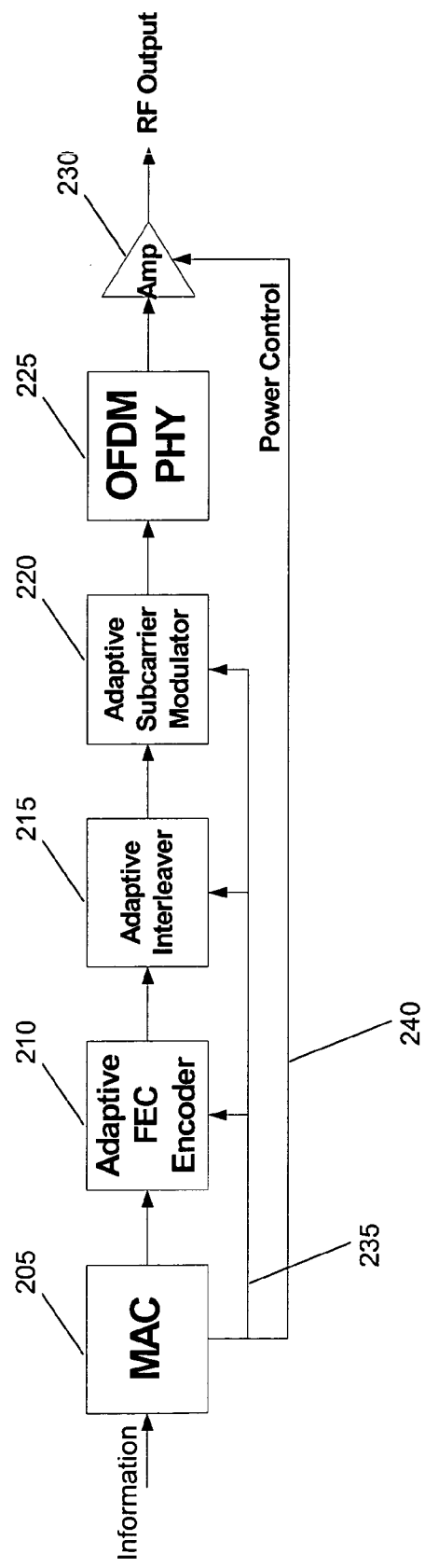
FIG. 2 is a block diagram of a modulator according to an example embodiment.

FIG. 2 is a block diagram of a modulator according to an example embodiment. Modulator 200 may modulate information and may perform other processing on information for transmission. The example modulator 200 in FIG. 2 may include a media access control (MAC) 205, an adaptive FEC encoder 210, an adaptive interleaver 215, an adaptive subcarrier modulator 220, an OFDM PHY 225 and an amplifier 230, although the invention is not limited thereto. These blocks of modulator 200 will now be briefly described.

Modulator 200 may receive information bits or a data block to be transmitted. The information is input to MAC 205. MAC 205 may perform many tasks, including tasks related to media access Forward error correction (FEC) encoder 210 is coupled to the output of MAC 205 and may perform FEC encoding or rate coding on the incoming information bits. FEC encoding may involve, for example, adding parity bits to the information bits to generate one or more codewords, although the invention is not limited thereto. The parity bits may allow error detection and/or error correction to be performed at the demodulator or receiver.

Figure 3:
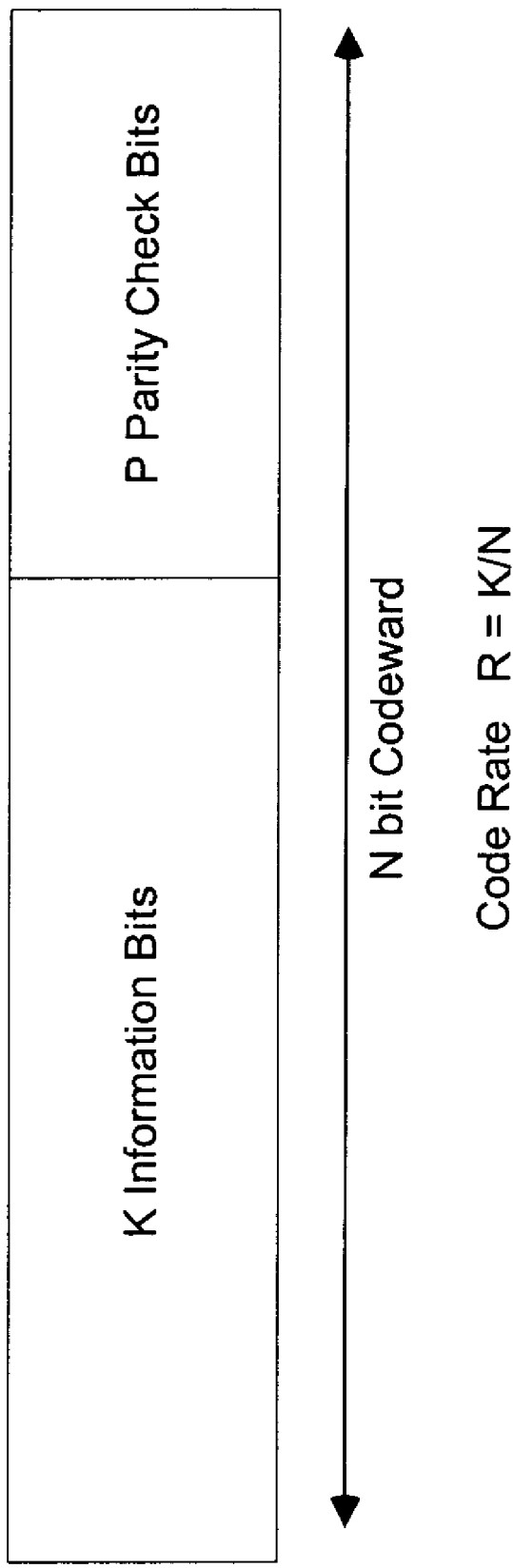
FIG. 3 is a diagram illustrating an example codeword.

FIG. 3 is a diagram illustrating an example codeword. As shown in the example codeword of FIG. 3, FEC encoding may involve appending P parity check bits to each K block of information bits to form an N bit codeword (where N=P+K), although the invention is not limited thereto. The code rate (R) may be considered to be the ratio of the number of information bits to the total number of bits in a codeword, or R=K/N. A lower code rate may be considered to be more robust due to the higher number (or higher percentage) of parity bits in the codeword, which may allow improved error detection and correction at the receiver, but at the cost of a lower data rate.

Referring to FIG. 2 again, adaptive interleaver 215 is coupled to an output of FEC encoder 210. For example, interleaver 215 may interleave bits in various OFDM subcarriers (e.g., either linearly or by interleaving the bits or codewords), although the invention is not limited thereto. Interleaver 215 may be omitted in some cases from demodulator 200.

In the modulator 200 in FIG. 2, adaptive subcarrier modulator 220 is coupled to an output of adaptive interleaver 215. In the absence of interleaver 215, modulator 220 may be coupled to FEC encoder 210, although the invention is not limited thereto. Adaptive subcarrier modulator 220 may adaptively modulate one or more bits onto one or more carriers or subcarriers using a modulation scheme or schemes. For example, subcarrier modulator 220 may modulate bits (e.g., FEC encoded bits) onto a plurality of OFDM subcarriers, although the invention is not limited thereto. Adaptive subcarrier modulator 220 may modulate bits using a selected one of a plurality of modulation schemes, for example. For example, one modulation scheme may be adaptively selected for all OFDM subcarriers based on a detected criteria, such as a detected channel condition or channel conditions. On the other hand, the channel condition or other criteria may be detected for each subcarrier, and then a different modulation scheme may be used for each OFDM subcarrier based on the channel condition for that particular subcarrier, although the invention is not limited thereto.

Adaptive subcarrier modulator 220 may use any of a variety of modulation schemes. Some example modulation schemes may include binary phase shift keying (BPSK) which transmits two different symbols (1 bit per symbol), quadrature phase shift keying (QPSK), 8-PSK (8 different symbols encoding 3 bits/symbol), quadrature amplitude modulation (QAM), QAM 16 (16 different symbols to encode 4 bits/symbol), QAM 32, QAM 64, QAM 256, etc. These are just a few example modulation schemes and the invention is not limited thereto. As compared to lower level modulation schemes, the higher level modulation schemes may provide a higher data rate due to a greater number of bits per symbol for higher level modulation schemes. However, it may be more difficult to correctly recover the data at the receiver for higher level modulation schemes due to the increased number of possible symbols. Therefore, according to an example embodiment, a modulation scheme may be selected based upon a detected channel condition. This may allow a higher level modulation scheme to be used for higher quality channels, and a lower-level modulation scheme to be used for a lower quality channel, although the invention is not limited thereto.

In FIG. 2, a PHY (or physical layer interface), such as a OFDM PHY 225 is coupled to an output of adaptive subcarrier modulator 220 and may generate signals having the appropriate qualities, such as the appropriate voltages, timing, etc. Amplifier 230 is coupled to an output of OFDM PHY 225 to amplify the signals output from the PHY 225. The signals generated by amplifier 230 may be transmitted via an antenna over a wireless channel, for example, or over other type of channel.

MAC 205 may control or coordinate via line 235 the operation of one or more of FEC encoder 210, adaptive interleaver 215 and adaptive subcarrier modulator 220, although the invention is not limited thereto. MAC 205 may also control or coordinate via line 240 a level of amplification performed by amplifier 230.

Figure 4:
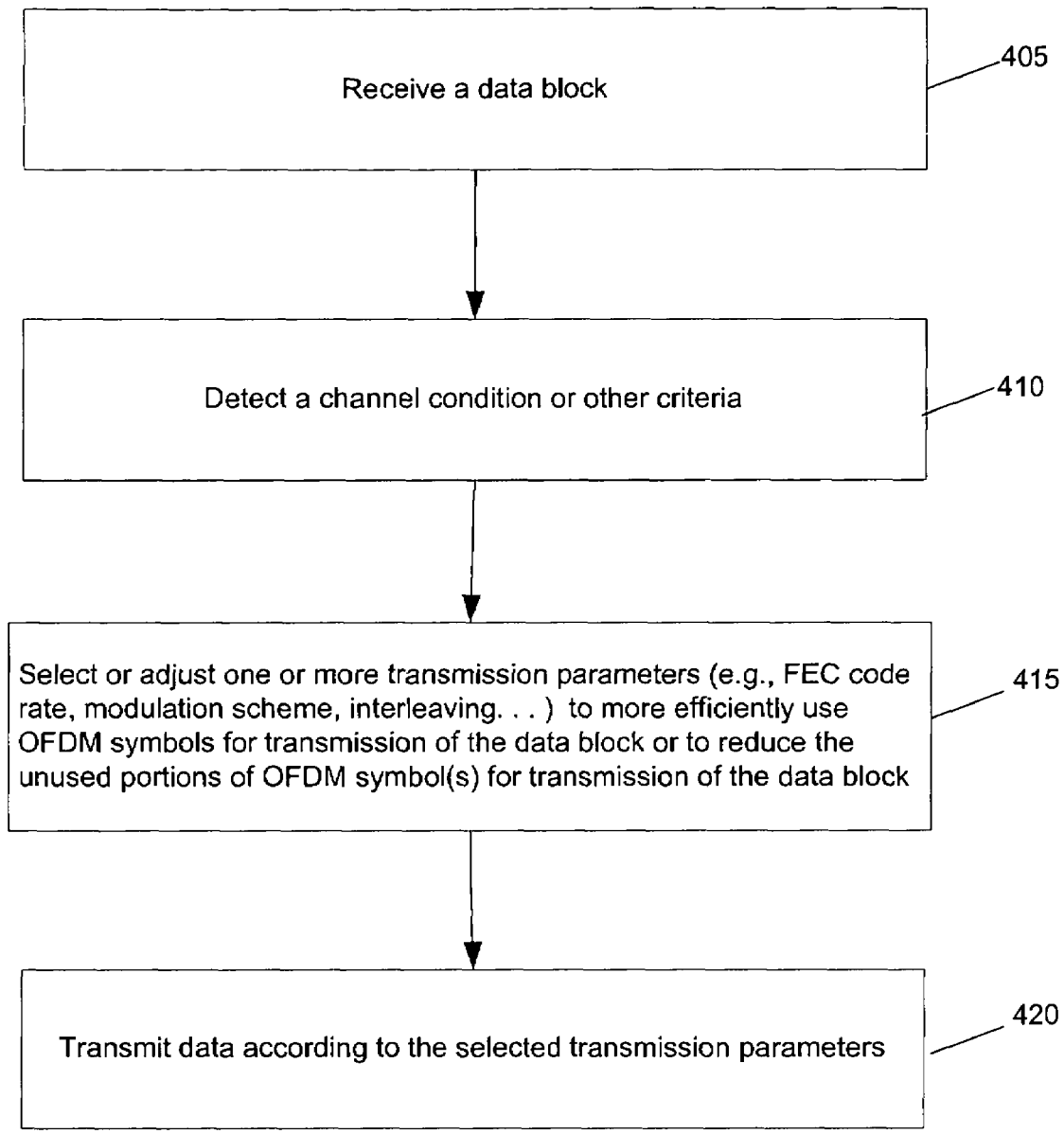
FIG. 4 is a flow chart illustrating operation of a modulator according to an example embodiment.

FIG. 4 is a flow chart illustrating operation of a modulator according to an example embodiment. At 405, the modulator receives a data block, which may be a group of information bits. The block of data may be of variable size, although the invention is not limited thereto.

At 410, the modulator 200 (such as MAC 205, for example) may detect a channel condition or other criteria. The channel condition may provide information to the modulator 200 that describes the current condition or quality of a channel (or carrier or subcarrier). Various frequency bands or channels may receive various types of interference, noise, selective fading and other conditions which may degrade the quality of a channel, from time to time. Modulator 200 may detect the channel condition of a particular frequency band or bands using a variety of different techniques, including measuring bit error rate (BER), measuring packet error rate or packet transmission failure rate, measuring signal to noise ratio (SNR) for received signals, exchanging Channel Side Information (CSI) with another terminal, maintaining and updating a channel estimate which may estimate the current condition or quality of a channel, etc. These are just a few examples of how a channel condition may be detected, although the invention is not limited thereto.

In a multicarrier system, such as an OFDM system, where information is transmitted over multiple carriers or subcarriers, the MAC 205 may measure the channel condition for each (or one or more) of the different subcarriers, although the invention is not limited thereto.

At 415, MAC 205 may select (or adjust) one or more transmission parameters to more efficiently use the OFDM symbols for transmission of the data block and/or to reduce any unused portion(s) of OFDM symbols (OFDM subcarriers). The transmission parameters may be selected or adjusted based upon, for example, the detected channel condition of one or more channels or subcarriers, the size of the data block to be transmitted, or other information, although the invention is not limited thereto. The transmission parameters that may be selected or adjusted may include, for example, the FEC code rate, decision to use interleaving (or type of interleaving used), a modulation scheme(s), etc.

The modulation scheme may be selected or adjusted for one or more OFDM subcarriers, and there may be one modulation scheme used for one or more OFDM subcarriers, possibly even all subcarriers, although the invention is not limited thereto. Alternatively, there may be a modulation scheme selected by MAC 205 for each OFDM subcarrier (adaptive subcarrier modulation), for example, based upon a detected channel condition for each subcarrier, although the invention is not limited thereto.

According to an example embodiment, different thresholds for the detected channel condition may be used to select different modulation schemes, although the invention is not limited thereto. For example, if the detected channel condition meets a first threshold, then a first modulation scheme may be used for that channel or subcarrier. If the detected channel condition meets a second threshold, then a second modulation scheme may be used for the channel or subcarrier.

At 420, the data block may be processed and then transmitted according to the selected transmission parameters. This may involve FEC encoding based on a selected code rate, interleaving the encoded data, performing OFDM subcarrier modulation, and then amplifying the data for transmission over a channel, although the invention is not limited thereto. This may be accomplished, for example, by MAC 205 providing control information via line 235 to control or coordinate FEC encoder 210 to encode using a selected code rate, to control adaptive interleaver 215 to use a selected type of interleaving, to control adaptive subcarrier modulator 220 to modulate the one or more OFDM subcarriers using the one or more selected modulation schemes, etc., although the invention is not limited thereto.

The one or more transmission parameters may be selected or adjusted to more efficiently use the OFDM symbols or OFDM subcarriers. This selection of transmission parameters may reduce the amount of the unused portion of OFDM symbols, and therefore, may reduce the amount of zero-extending and data repeating of one or more OFDM symbols. By selecting or adjusting the transmission parameters, it may be possible to improve the robustness of the transmission of the data block by making constructive use of a greater portion of the OFDM symbols or subcarriers including such unused portion of OFDM symbols, although the invention is not limited thereto. It may be possible in some cases to adjust the transmission parameters to transmit the data block using substantially all of a plurality of OFDM symbols, although the invention is not limited thereto. In some cases after selecting or adjusting transmission parameters, an unused portion of an OFDM symbol may still result for transmission of a data block (which may then involve zero-extending or repeating data for such unused portion), but selection or adjustment of transmission parameters may at least decrease the amount of the unused portion(s) of an OFDM symbol(s) for the transmission of a data block.

In some cases, the one or more transmission parameters may be selected or adjusted to use substantially all (or at least a larger percentage of) of the OFDM symbols (or OFDM subcarriers) to transmit the data block, although the invention is not limited thereto. According to an embodiment, one or more transmission parameters may be selected such that transmission of the data block may fill substantially all bits and/or all subcarriers in an integer number of OFDM symbols (e.g., little if any unused portion of OFDM symbol), although the invention is not limited thereto. According to an example embodiment, one or more transmission parameters may be selected or adjusted so that the end of a transmitted data block may substantially align with the end of an OFDM symbol. For example, the FEC code rate may be decreased and/or the modulation scheme may be decreased (for one or more subcarriers) to make constructive use of what may (e.g., in the absence of such selection or adjustment) have been an unused portion of the last OFDM symbol, and thereby improve the robustness of the transmission of the data block, although the invention is not limited thereto.

Figure 5:
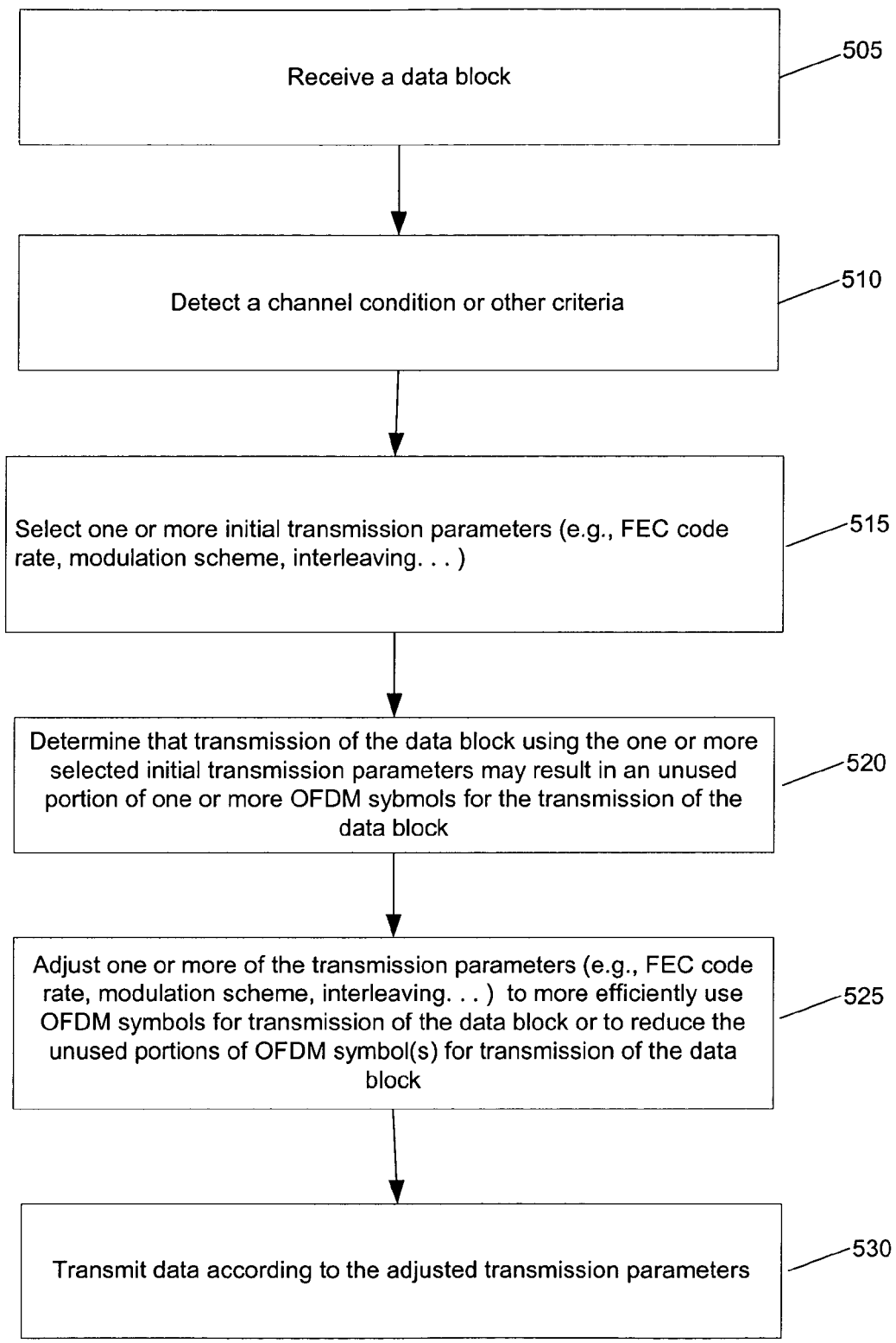
FIG. 5 is a flow chart illustrating operation of a modulator according to another example embodiment.

FIG. 5 is a flow chart illustrating operation of a modulator according to another example embodiment. At 505 a data block is received. At 510, MAC 205 detects a channel condition for one or more channels.

Referring to FIG. 5, at 515 one or more initial transmission parameters may be selected or detected (e.g., these parameters may be initially set by hardware or software). According to an example embodiment, these parameters may be selected by MAC 205, although the invention is not limited thereto. For example, an initial modulation scheme may be selected (e.g., a modulation scheme for each OFDM subcarrier based on channel detected condition for that subcarrier). Likewise, an initial code rate may be selected. For example, a default code rate or other code rate may be initially selected for use, although the invention is not limited thereto.

At 520, the modulator 200 (e.g., MAC 205) may determine that transmission of the data block using the one or more initial transmission parameters may result in an unused portion of one or more OFDM symbols. An OFDM symbol may include the transmission of a plurality of subcarrier symbols, that is, data transmitted on a plurality of subcarriers during the OFDM symbol (e.g., in parallel). The determination of block 520 may be performed based on the size of the data block, the initially selected code rate, the one or more initially selected modulation scheme(s), although the invention is not limited thereto.

For example, the number of OFDM symbols needed to transmit the encoded data block may be calculated, for example, as:

Number of OFDM symbols=[(total no. of bits)/(no. of bits/subcarrier symbol)*(no. of subcarriers)], where the total no. of bits is the total number of encoded bits of the block to be transmitted, the no. of bits/subcarrier symbol is the number of bits per subcarrier symbol based on the initial selected modulation scheme, and the no. of subcarriers is the number of OFDM subcarriers for each OFDM symbol. This is simply an example, and the invention is not limited thereto. For example, this calculation may be adjusted if different subcarriers use different modulation schemes (e.g., different number of bits per subcarrier symbol), although the invention is not limited thereto. Other variations may apply.

In some cases, this calculation may indicate that the end of the transmitted data block may not align with the end of an OFDM symbol. For example, the end of the transmitted data block may occur in the middle of an OFDM symbol, resulting in a portion or fraction of the last OFDM symbol that is unused. The calculation in 520 may indicate that 16.5 symbols are needed to transmit the data block, resulting in 0.5 symbols that would be unused. This may occur, for example, by one or more subcarriers of a last OFDM symbol being unused (or unnecessary) to transmit the data block. As noted above, some OFDM systems deal with this by zero extending the data or repeating the data until the OFDM has been filled. However, this may be considered to be a waste of OFDM resources.

At block 525, one or more of the transmission parameters may be adjusted to more efficiently use the OFDM symbols for transmitting the data block or to reduce the unused portion of OFDM symbols, although the invention is not limited thereto. According to an example embodiment, the transmission parameters may be adjusted to substantially fill up the available OFDM symbols with encoded data. This may be a more constructive and efficient use of the OFDM symbols (as compared to zero-extending, etc.), and may improve the robustness of the data transmission. In some cases, this may result in the encoded data being transmitted substantially in an integer number of OFDM symbols (reducing an unused fraction of OFDM symbol).

At 530, the modulator then transmits the block of data according to the adjusted transmission parameters.

Figure 6:
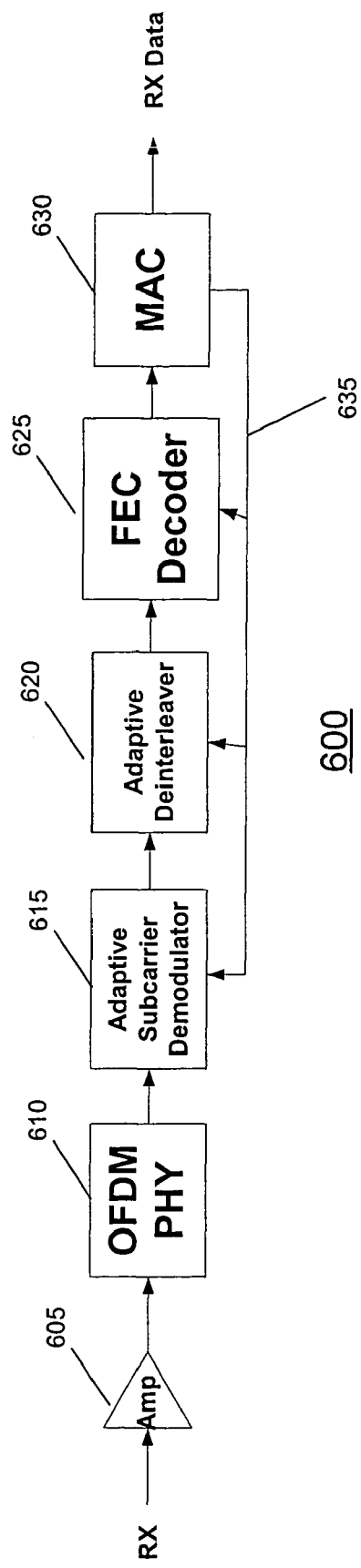
FIG. 6 is a block diagram of a demodulator according to an example embodiment.

FIG. 6 is a block diagram of a demodulator according to an example embodiment. Referring to FIG. 6, data may be received via a wireless channel through an antenna (not shown in FIG. 6) or other channel and passed to amplifier 605. OFDM PHY 610 is coupled to the output of amplifier 605, and may generate signals having the appropriate qualities, such as the appropriate voltages, timing, etc.

In FIG. 6, an adaptive subcarrier demodulator 615 may be coupled to OFDM PHY 610 and may demodulate one or more received signals, such as demodulating one or more OFDM subcarriers. An adaptive de-interleaver 620 is coupled to subcarrier demodulator 615 to de-interleave received signals in some cases. An FEC decoder 625 is coupled to an output of de-interleaver 620 to decode codewords into data bits.

Referring to FIG. 6, a MAC 630 is provided to control the operation of one or more of adaptive subcarrier demodulator 615, adaptive de-interleaver 620, and FEC decoder 625. MAC 630 may perform tasks related to media access to a channel and other tasks. MAC 630 may receive control information from a remote node, such as provided in one or more fields or messages, which may indicate one or more selected transmission parameters. MAC 630 may then control, based on the received control information, various blocks of demodulator 600, including to control adaptive subcarrier demodulator 615 to demodulate according to one or more specified modulation schemes, to control de-interleaver 620 to perform (or not perform) de-interleaving, to control FEC decoder 625 to FEC decode using a selected rate code, etc., although the invention is not limited thereto. The resulting data may be output by MAC 630.

In an example embodiment, transceiver 110 may include one or both of modulator 200 and demodulator 600, and MAC 235 and MAC 630 may comprise the same MAC for example, although the invention is not limited thereto. Transceiver 110 may include additional blocks or components.

Figure 7:
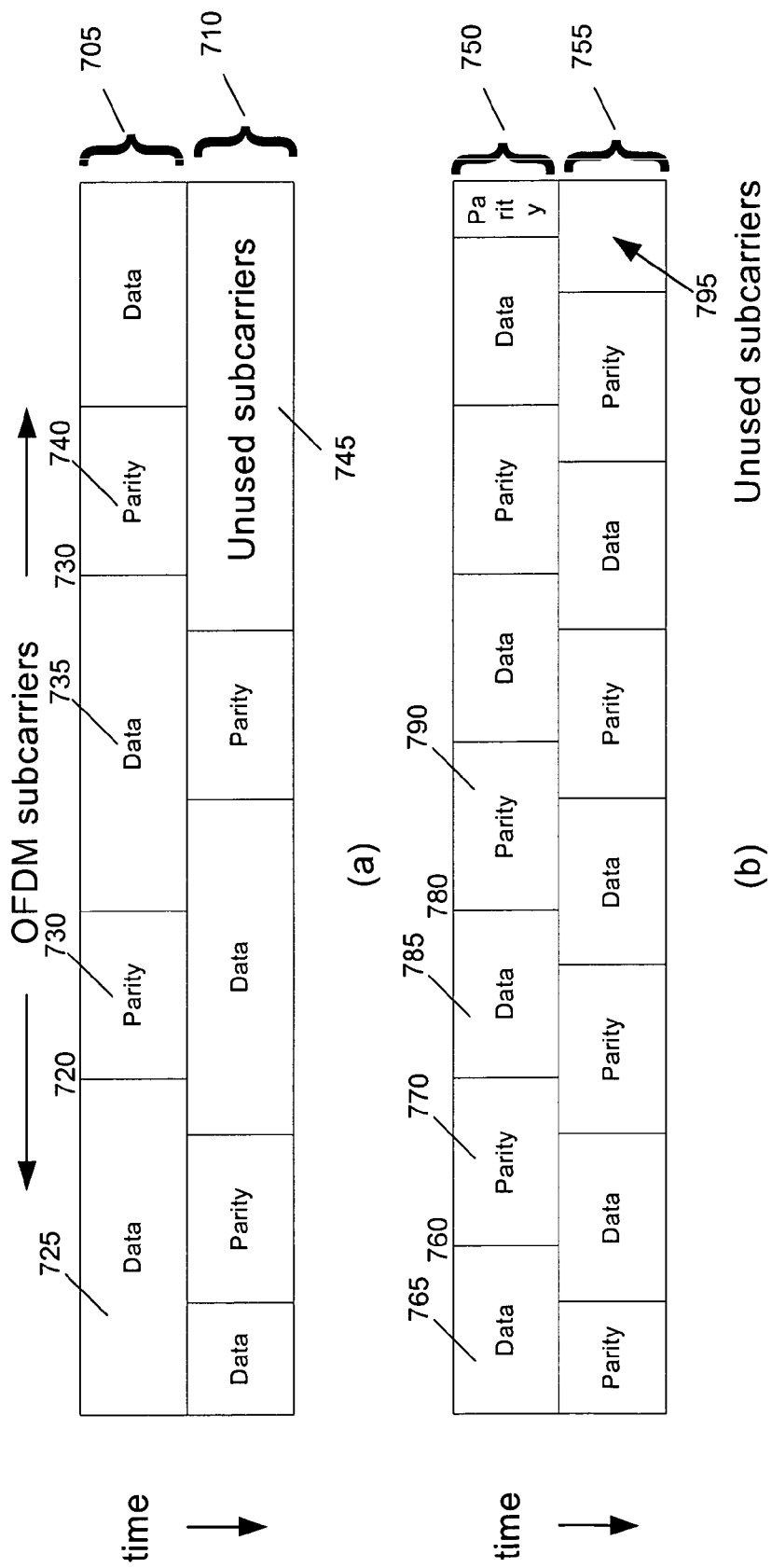
FIG. 7 is a diagram illustrating an adjustment of a transmission parameter according to an example embodiment.

FIG. 7 is a diagram illustrating an adjustment of a transmission parameter according to an example embodiment. FIG. 7 includes FIG. 7a and FIG. 7b. In FIG. 7a, there are four codewords transmitted using two OFDM symbols, symbol 705 and symbol 710. While two OFDM symbols are shown, any number of OFDM symbols may be used to transmit a data block. Although not shown in FIG. 7a, each OFDM symbol (shown as a separate row) may include data transmitted on a plurality of OFDM subcarriers. Each of the four codewords include a data portion and a parity portion. For example, the codewords include codeword 720, which includes a data portion 725 and a parity portion 730, a second codeword 730, which includes a data portion 715 and a parity portion 740. Two additional codewords are shown in FIG. 7a, but not numbered. The codewords for the data block shown in FIG. 7a are transmitted using a block code, for example, at a code rate of R=⅔. In this case, the transmission of this data block using two OFDM symbols (705, 710) results in a significant unused portion of the last OFDM symbol 710 (shown in FIG. 7a as unused OFDM subcarriers 745).

FIG. 7b is a diagram illustrating a transmission of a data block after the codewords have been shortened and the code rate has been decreased to R=½ to more efficiently use the OFDM symbols. This code rate adjustment leaves a much smaller region 795 (FIG. 7b) of unused subcarriers as compared to region 745 in FIG. 7a. This is merely an example, and the invention is not limited thereto. Thus, the encoded data may be said to now substantially match the group of OFDM symbols, although not a perfect match.

In the example shown in FIG. 7b, seven codewords are transmitted using two OFDM symbols (symbols 750 and 755), and each codeword may include a data portion and a parity portion. The codewords may include a first codeword 760, which includes a data portion 765 and a parity portion 770, a second codeword 780, which includes a data portion 785 and a parity portion 790, and so forth.

In the example of FIG. 7b, the example codewords may be shorter than the codewords of FIG. 7a, due to a shorter data portion for each codeword, resulting in more codewords for the two symbols, although the invention is not limited in this respect. As a result, the code rate has been decreased to ½, based on using at least a portion of unused subcarriers 745 (FIG. 7a) to add additional parity bits and thereby improve the robustness of the data transmission, although the invention is not limited thereto. By decreasing the code rate (e.g., by increasing the percentage of parity bits in each codeword), the encoded data block has been adjusted or expanded (by adding additional parity bits) to fill more (or a larger portion) of the OFDM symbols and improve the robustness of the data block transmission, although the invention is not limited thereto.

FIG. 7a may represent an initially selected code rate (R=⅔), and FIG. 7b may represent a code rate (e.g., R=½) that has been adjusted or selected to better use the OFDM symbols to reduce an unused portion of an OFDM symbol and improve the robustness of the data transmission, for example, by adjusting the code rate to fill a larger portion of the OFDM symbols with encoded data, although the invention is not limited thereto. While the codewords may be shortened and the code rate may be decreased (e.g., to ½) to leave a much smaller region of unused subcarriers 795, a finer adjustment of shortening the codeword length or a finer adjustment of the code rate may be applied to substantially eliminate the region of unused subcarriers (795).

A variety of modulation schemes may be used (or may have been selected), including a constant uniform modulation scheme (e.g., same for all subcarriers), an adaptive modulation scheme that may be the same for all subcarriers, an adaptive per subcarrier modulation (where a modulation scheme for each subcarrier may be independently adapted or adjusted), etc.

Figure 8:
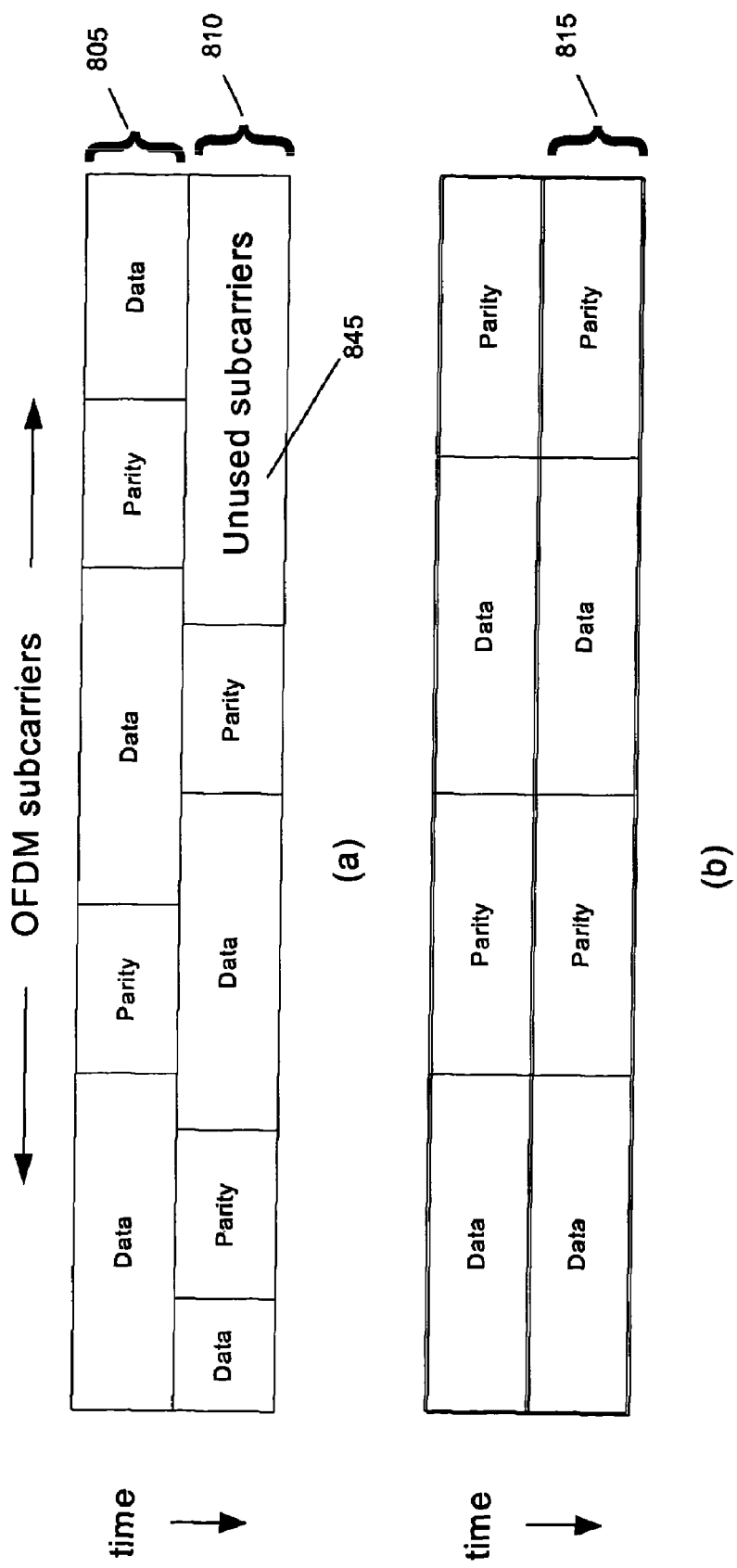
FIG. 8 is a diagram illustrating an adjustment of a transmission parameter according to another example embodiment.

FIG. 8 is a diagram illustrating an adjustment of a transmission parameter according to another example embodiment. In the example of FIG. 8a, an original mother code at a code rate of R=½, for example, may be punctured to provide a punctured code having a code rate of R=⅔. Puncturing may include, for example, dropping or not transmitting certain coded bits (e.g., certain parity bits) to increase the code rate. Puncturing may be used, for example, where an existing FEC encoder uses a particular code rate, and it is desirable to increase the code rate (e.g., decrease the percentage of parity bits by dropping or not transmitting one or more parity bits per codeword). At the receiving node, the receiver or demodulator may insert one or more dummy bits and then decode the message. This is only an example and the invention is not limited thereto. As shown in FIG. 8, the punctured code rate of R=⅔ unfortunately results in a significant portion 845 of unused subcarriers.

In this case, the amount of puncturing may be decreased, for example, by adding additional parity bits, to decrease the code rate to 6/11, for example, which is shown in FIG. 8b. The resulting code rate of 6/11 may reduce the unused portion (unused subcarriers), and may in some instances, substantially eliminate the unused subcarriers. Thus, as shown in FIG. 8b, decreasing the code rate to 6/11 may cause the transmitted data block to substantially align with the end of OFDM symbol 815. Therefore, in some cases where the original code has been punctured, the amount of puncturing may be decreased in order to decrease an amount of unused OFDM subcarriers, although the invention is not limited thereto.

Figure 9:
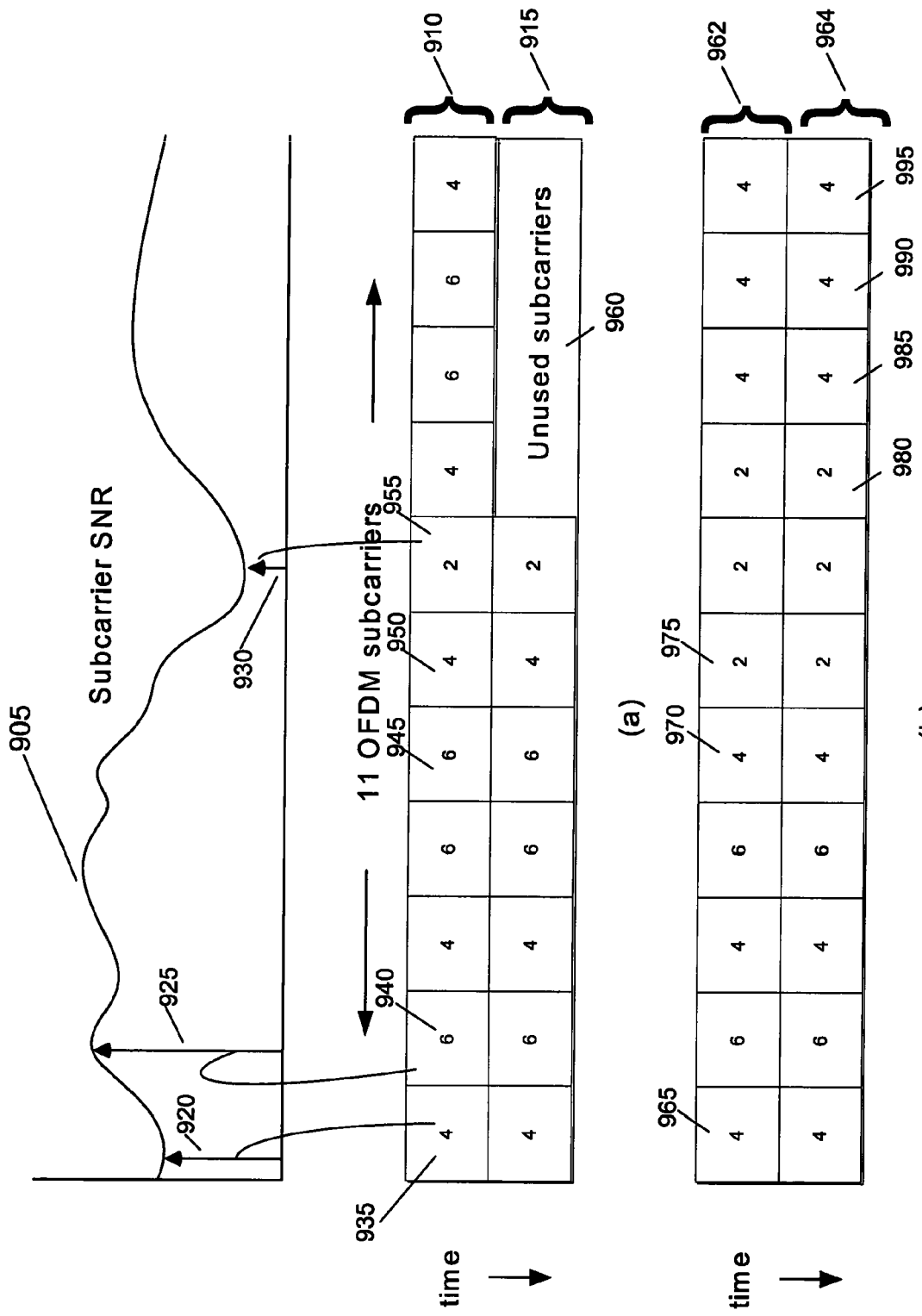
FIG. 9 is a diagram illustrating an adjustment of a transmission parameter according to yet another example embodiment.

FIG. 9 is a diagram illustrating an adjustment of a transmission parameter according to yet another example embodiment. Line 905 may depict a detected channel condition (e.g, signal to noise ratio or SNR in this example) for each of 11 OFDM subcarriers of an OFDM symbol, although the invention is not limited thereto. FIGS. 9a and 9b illustrate 84 coded bits across two OFDM symbols, with each OFDM symbol having 11 subcarrier symbols. In this example shown in FIG. 9, adaptive per-subcarrier modulation may be used, so that a modulation scheme may be selected for each OFDM subcarrier, for example, based on the detected channel condition for that subcarrier, although the invention is not limited thereto.

Two OFDM symbols are shown in FIG. 9a, including symbols 910 and 915, and two OFDM symbols are shown in FIG. 9b, including symbols 962 and 964. While only two OFDM symbols are shown, the invention is not limited thereto, and any number of OFDM symbols may be used to transmit a data block.

FIG. 9a illustrates the number of bits per symbol used for each subcarrier, which corresponds to the modulation schemes selected for each of the subcarriers, based on the detected channel condition for each subcarrier shown in line 905, although the invention is not limited thereto. For example, a relatively low SNR 930 in line 905 may result in 2 bits per symbol being selected for subcarrier 955, a medium SNR 920 may result in 4 bits per symbol being used for subcarrier 935, a relatively high SNR 925 may result in 6 bits per symbol being used for subcarrier 940, etc. The higher number of bits per symbol may correspond to higher level modulation schemes. These are just examples and the invention is not limited thereto.

According to an example embodiment, different thresholds for the detected channel condition may be used to select different modulation schemes, although the invention is not limited thereto. The selection of the modulation schemes shown in the example of FIG. 8a leaves four unused subcarriers 960 in OFDM symbol 915.

FIG. 9b illustrates the number of bits per symbol for each subcarrier after the thresholds for one or more (or all) modulation schemes have been adjusted, although the invention is not limited thereto. In this example shown in FIG. 9b, one or more thresholds for the detected channel conditions have been adjusted (e.g., increased) to reduce one or more of the modulation levels to substantially match the 84 coded bits to the available OFDM symbols. For example, due to the adjusted thresholds for the detected channel conditions, subcarrier 970 in FIG. 9b now is modulated using four bits per symbol, subcarrier 975 is modulated using only two bits per symbol, while subcarrier 965 continues to be modulated at the same level as in FIG. 9a. Thus, the change in the channel condition threshold(s) may result in a change (e.g., decrease) of a modulation level used for one or more subcarriers to spread the encoded data across a greater portion of the OFDM symbols, and thereby improve the robustness of the data block transmission. In this example, it can be seen that the last four subcarriers (980, 985, 990 and 995) of OFDM symbol 964 now include encoded data.

Therefore, one or more transmission parameters, such as the code rate and/or one or more modulation schemes, may be selected or adjusted to substantially match a block of encoded data to a group of OFDM symbols and substantially reduce an amount of unused subcarriers, although the invention is not limited thereto.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A computer-implemented method of selecting transmission parameters in a multicarrier system comprising:
    selecting one or more transmission parameters to substantially match a block of data to a group of multicarrier symbols by selecting one or more initial transmission parameters, determining that an unused portion of one or more multicarrier symbols may result from transmitting a data block according to the initial transmission parameters, and adjusting one or more of the transmission parameters to reduce the unused portion of the one or more multicarrier symbols by spreading the block of data across a greater portion of the one or more multicarrier symbols and reducing a number of unused subcarriers in the one or more multicarrier symbols.

2. The method of claim 1 wherein the selecting comprises selecting one or more transmission parameters to substantially match a block of encoded data to a group of multicarrier symbols, the multicarrier symbols comprising orthogonal frequency division multiplexing (OFDM) symbols.

3. The method of claim 1 wherein the transmission parameters include one or more selected from the group comprising:
    a code rate;
    one or more modulation schemes; and
    a type of interleaving or decision to perform interleaving or not.

4. The method of claim 1 wherein the selecting comprises selecting one or more transmission parameters to substantially match a block of encoded data to a group of multicarrier symbols.

5. The method of claim 1 wherein the selecting comprises selecting a code rate for encoding the data and/or one or more modulation schemes for modulating the encoded data so that the end of the block of encoded data substantially aligns with an end of one of the multicarrier symbols.

6. The method of claim 5 wherein the multicarrier symbols comprise orthogonal frequency division multiplexing (OFDM) symbols.

7. The method of claim 1 wherein the selecting comprises:
    detecting a channel condition;
    selecting a modulation scheme based on the detected channel condition;
    selecting a code rate such that the block of encoded data will substantially match a group of multicarrier symbols.

8. The method of claim 7 wherein an end of the encoded block of data will align with an end of one of the multicarrier symbols.

9. The method of claim 8 wherein the multicarrier symbols comprise orthogonal frequency division multiplexing (OFDM) symbols.

10. The method of claim 1 wherein the selecting comprises:
    detecting a channel condition for each of a plurality of subcarriers;
    selecting a modulation scheme for each subcarrier based on the detected channel conditions;
    selecting a code rate, wherein the modulation schemes and the code rate are selected such that a block of encoded data will substantially match a group of multicarrier symbols.

11. The method of claim 10 wherein the multicarrier symbols comprise orthogonal frequency division multiplexing (OFDM) symbols.

12. The method of claim 1 wherein the selecting comprises:
    selecting one or more of an initial code rate and an initial modulation scheme;
    decreasing the code rate and/or decreasing a level of the modulation scheme to reduce an amount of an unused portion of one or more multicarrier symbols.

13. The method of claim 12 wherein the decreasing comprises decreasing the code rate and/or decreasing a level of the modulation scheme to reduce an amount of an unused portion of one or more multicarrier symbols so that an end of an encoded data block substantially aligns with the end of one of the multicarrier symbols.

14. The method of claim 1 wherein the selecting comprises:
detecting an initial code rate;
decreasing the code rate to match a block of encoded data to a group of multicarrier symbols.

15. The method of claim 1 wherein the selecting comprises:
detecting an initial code rate;
decreasing a code rate by decreasing an amount of puncturing to substantially match a block of encoded data to a group of multicarrier symbols.

16. The method of claim 1 wherein the selecting comprises decreasing a code rate by increasing an amount of parity bits in each codeword to substantially match a block of encoded data to a group of multicarrier symbols.

17. The method of claim 1 wherein the selecting comprises decreasing a level of one or more modulation schemes to substantially match a block of encoded data to a group of multicarrier symbols.

18. A computer-implemented method of selecting transmission parameters in an orthogonal frequency division multiplexing (OFDM) system comprising:
detecting a channel condition for one or more OFDM subcarriers;
selecting an initial modulation scheme for one or more OFDM subcarriers based on the detected channel condition;
determining that an unused portion of one or more OFDM subcarriers may result from transmitting a data block according to the initial modulation scheme;
adjusting the modulation schemes and/or selecting a code rate to reduce the unused portion of the one or more OFDM subcarriers by spreading the block across a greater portion of the one or more multicarrier symbols and reducing a number of unused subcarriers in the one or more multicarrier symbols.

19. The method of claim 18 wherein the selecting an initial modulation scheme comprises selecting an initial modulation scheme for each of a plurality of OFDM subcarriers based upon a detected channel condition for the subcarrier.

20. The method of claim 18 wherein the detected channel conditions include one or more thresholds, each threshold corresponding to a modulation scheme, the adjusting comprising adjusting one or more of the thresholds.

21. The method of claim 20 wherein the adjusting one or more of the thresholds comprises increasing one or more of the thresholds to thereby decrease the modulation level for one or more OFDM subcarriers.

22. A computer-implemented method of selecting transmission parameters in an orthogonal frequency division multiplexing (OFDM) system comprising:
detecting a channel condition for one or more OFDM subcarriers;
selecting an initial modulation scheme for one or more OFDM subcarriers;
determining that an unused portion of one or more OFDM subcarriers may result from transmitting a data block according to the initial transmission parameters; and
performing at least one of the following:
1) adjusting the modulation scheme for the one or more OFDM subcarriers to reduce the unused portion of the one or more OFDM subcarriers by spreading the block across a greater portion of one or more OFDM symbols and reducing a number of unused subcarriers in the one or more OFDM symbols; and
2) selecting a code rate to encode data to reduce the unused portion of the one or more OFDM subcarriers by spreading the block across a greater portion of the one or more OFDM symbols and reducing a number of unused subcarriers in the one or more OFDM symbols.

23. The method of claim 22 wherein the selecting an initial modulation scheme comprises selecting an initial modulation scheme for each of a plurality of OFDM subcarriers based upon a detected channel condition for the subcarrier.

24. The method of claim 22 wherein the detected channel conditions include one or more thresholds, each threshold corresponding to a modulation scheme, the adjusting comprising adjusting one or more of the thresholds.

25. The method of claim 24 wherein the adjusting one or more of the thresholds comprises increasing one or more of the thresholds to thereby decrease the modulation level for one or more OFDM subcarriers.

26. A method of data transmission comprising:
selecting one or more initial transmission parameters;
receiving a data block;
selecting one or more of a code rate and modulation scheme for the data block such that the data block may be transmitted substantially over an integer number of orthogonal frequency division multiplexing (OFDM) symbols;
determining that an unused portion of one or more OFDM symbols may result from transmitting a data block according to the initial transmission parameters; and
adjusting one or more of the transmission parameters to reduce the unused portion of the one or more OFDM symbols by spreading the block of data across a greater portion of the one or more OFDM symbols and reducing a number of unused subcarriers in the one or more OFDM symbols.

27. The method of claim 26 and further comprises detecting a channel condition.

28. The method of claim 27 wherein the detecting comprises one or more of:
detecting a received signal strength;
detecting one or more bit errors;
measuring a bit error rate;
measuring a packet error rate; and
measuring a signal to noise ratio.

29. The method of claim 27 wherein the selecting is performed based at least in part on the detected channel condition.

30. The method of claim 27 wherein the selecting is performed based at least upon the detected channel condition and the size of the data block.

31. The method of claim 27 wherein the detecting a channel condition comprises detecting a channel condition for at least one subcarrier in an OFDM system.

32. The method of claim 26 wherein the selecting one or more of a code rate and modulation scheme for the data block is performed such that the data block may be transmitted to fill substantially all bits in an integer number of OFDM symbols.

33. The method of claim 26 wherein the selecting is performed such that the data block may be transmitted to substantially fill all OFDM subcarriers of the integer number of OFDM symbols.

34. A method of transmission parameter selection in a multicarrier system comprising:
receiving a data block;
selecting one or more of an initial code rate and an initial modulation scheme;

determining that transmission of the data block using the selected initial code rate and/or selected initial modulation scheme may result in an unused portion of an OFDM symbol;

adjusting one or more of the code rate and modulation scheme such that the unused portion of the OFDM symbol will be reduced for transmission of the data block by spreading the block of data across a greater portion of the OFDM symbol and reducing a number of unused subcarriers in the OFDM symbol.

35. The method of claim 34 wherein the adjusting comprises decreasing either the code rate or decreasing a level of modulation.

36. The method of claim 34 wherein the adjusting comprises adjusting one or more of the code rate and modulation scheme such that the encoded data block will substantially match a group of OFDM symbols.

37. A modulator comprising:
an adaptive encoder; and
an adaptive subcarrier modulator coupled to the encoder;
the modulator to determine that an unused portion of one or more multicarrier symbols may result from transmitting a data block according to an initial transmission parameters and to adaptively select or adjust one or more of the code rate and one or more modulation schemes to reduce the unused portion of the one or more multicarrier symbols by spreading the block of data across a greater portion of the one or more multicarrier symbols and reducing a number of unused subcarriers in the one or more multicarrier symbols.

38. The modulator of claim 37 and further comprising:
a media access control coupled to the encoder, the media access control to detect a channel condition; and
an OFDM PHY coupled to the adaptive subcarrier modulator.

39. The modulator of claim 38 wherein the adaptive subcarrier modulator performs adaptive subcarrier modulation on a per subcarrier basis based upon a detected channel condition for the corresponding OFDM subcarrier.

40. The modulator of claim 37 wherein the multicarrier symbols comprise orthogonal frequency division multiplexing (OFDM) symbols.

41. A transceiver comprising:
a modulator comprising:
an adaptive encoder;
an adaptive subcarrier modulator coupled to the encoder; and
the modulator to determine that an unused portion of one or more OFDM symbols may result from transmitting a data block according to an initial transmission parameters and to adaptively select or adjust one or more of the code rate and one or more modulation schemes to reduce the unused portion of the one or more OFDM symbols by spreading the block of data across a greater portion of the one or more OFDM symbols and reducing a number of unused subcarriers in the one or more OFDM symbols; and
a demodulator coupled to the modulator.

42. The transceiver of claim 41 wherein the modulator further comprises:
a media access control coupled to the encoder;
an adaptive interleaver coupled to the encoder; and
an OFDM PHY coupled to the adaptive subcarrier modulator.

43. The transceiver of claim 41 wherein the demodulator comprises:
a media access control coupled to the encoder;
an adaptive subcarrier demodulator coupled to the media access control;
an adaptive de-interleaver coupled to the subcarrier demodulator; and
a decoder coupled to the de-interleaver.

44. A wireless communication system comprising:
a transceiver, the transceiver comprising:
a modulator comprising:
an encoder;
a subcarrier modulator coupled to the encoder; and
the modulator to determine that an unused portion of one or more OFDM symbols may result from transmitting a data block according to an initial transmission parameters and to adaptively select or adjust one or more of the code rate and one or more modulation schemes to reduce the unused portion of the one or more OFDM symbols by spreading the block of data across a greater portion of the one or more OFDM symbols and reducing a number of unused subcarriers in the one or more OFDM symbols; and
a demodulator coupled to the modulator; and
an omni directional antenna coupled to the transceiver.

45. The wireless communication system of claim 44 wherein the demodulator comprises:
a media access control coupled to the encoder;
an adaptive subcarrier demodulator coupled to the media access control;
an adaptive de-interleaver coupled to the subcarrier demodulator; and
a decoder coupled to the de-interleaver.

46. The wireless communication system of claim 44 wherein the modulator to reduce a code rate and/or decrease a level of modulation for one or more OFDM subcarriers to substantially match an encoded block of data to a group of OFDM symbols.

47. An article of manufacture comprising:
a computer-readable storage medium;
said computer-readable storage medium including stored thereon instructions that, when executed by a computer processor, result in:
selecting one or more initial transmission parameters;
receiving a data block;
selecting one or more of a code rate and modulation scheme for the data block such that the data block may be transmitted substantially over an integer number of orthogonal frequency division multiplexing (OFDM) symbols;
determining that an unused portion of one or more OFDM symbols may result from transmitting a data block according to the initial transmission parameters; and
adjusting one or more of the transmission parameters to reduce the unused portion of the one or more OFDM symbols by spreading the block of data across a greater portion of the one or more OFDM symbols and reducing a number of unused subcarriers in the one or more OFDM symbols.

48. The article of manufacture of claim 47 wherein the instructions further result in detecting a channel condition, the selecting being based in part on the detected channel condition.

49. The article of manufacture of claim 48 wherein the instructions resulting in the detecting comprises one or more of:
detecting a received signal strength;
detecting one or more bit errors;
measuring a bit error rate;
measuring a packet error rate; and
measuring a signal to noise ratio.

* * * * *